US006777014B2

(12) United States Patent
Singh (10) Patent No.: US 6,777,014 B2
(45) Date of Patent: Aug. 17, 2004

(54) AGGLOMERATED MILK IN COFFEE AND TEA

(76) Inventor: Harjit Singh, 3303 NE. 15th Ct., Ft. Lauderdale, FL (US) 33304

(*) Notice: Subject to any disclaimer, the term of this patent is extended or adjusted under 35 U.S.C. 154(b) by 243 days.

(21) Appl. No.: 09/898,968

(22) Filed: Jul. 3, 2001

(65) Prior Publication Data

US 2003/0008053 A1 Jan. 9, 2003

(51) Int. Cl.[7] .............................. A23C 9/00; A23F 3/00; A23F 5/00; A23L 2/38
(52) U.S. Cl. ...................... 426/569; 426/593; 426/596; 426/597; 426/453; 426/594; 426/580; 426/590
(58) Field of Search ................................ 426/580, 590, 426/594, 569, 593, 596, 597, 453

(56) References Cited

U.S. PATENT DOCUMENTS

| | | | | |
|---|---|---|---|---|
| 3,555,698 A | * | 1/1971 | Boer ............................ | 34/443 |
| 3,987,715 A | * | 10/1976 | Muller ......................... | 99/275 |
| 4,215,801 A | * | 8/1980 | Newman et al. ............... | 222/63 |
| 4,885,848 A | * | 12/1989 | Christensen ................... | 34/582 |
| 5,024,848 A | | 6/1991 | Little | |
| 5,149,558 A | | 9/1992 | Little et al. | |
| 5,284,674 A | * | 2/1994 | Fazio | |
| 5,773,061 A | * | 6/1998 | Getler et al. ................. | 426/285 |
| 5,839,207 A | * | 11/1998 | Christensen et al. .......... | 34/369 |
| 6,250,506 B1 | * | 6/2001 | Geiger et al. ................ | 222/105 |
| 6,382,470 B1 | * | 5/2002 | Hu et al. ..................... | 222/203 |

FOREIGN PATENT DOCUMENTS

| | | | |
|---|---|---|---|
| GB | 2255703 | * | 11/1992 |
| IE | 73466 | * | 6/1997 |

* cited by examiner

*Primary Examiner*—Anthony Weier
(74) *Attorney, Agent, or Firm*—Kevin P. Crosby, Esq.; Daniel C. Crilly, Esq.; Brinkley, McNerney et al.

(57) ABSTRACT

A process for preparing a consumable beverage containing a natural dairy beverage additive in the form of agglomerated natural milk powder. The powder is combined with other ingredients, either prior to being placed in the vending machine or upon demand within the vending machine, for the subsequent creation of a consumable beverage which includes the natural dairy beverage additive.

29 Claims, 9 Drawing Sheets

AGGLOMERATED MILK IN COFFEE AND TEA

FIELD OF INVENTION

This invention relates to the use of agglomerated/freeze dried milk powder in beverage such as coffee and tea as an alternative to artificially made coffee whiteners and liquid milk.

BACKGROUND OF THE INVENTION

The concept of using liquid milk in coffee and tea has been prevalent for over a hundred years.

The use of milk substitutes in powder form for coffee originated about 40 years ago. These milk substitutes made as "coffee-whiteners" were formulated with corn syrup solids, hydrogenated oils (for fat), artificial coloring and preservatives. However, ironically nobody has applied the direct use of dry milk powder in coffee or tea.

There are several reasons for this:
1. Most milk powders are processed and dried through single stage spray dryers; with applications being limited to reconstituting; baking, use in confectionary and being used as additive to soup mixes, etc. A powder that is dried in a single stage spray dryer has limited solubility and tends to clump up if used in a vending machine or if it was directly used in a hot beverage.
2. The lack of knowledge and use of the "Agglomeration Technology" that now enables the product to be more soluble has also been limited. Agglomeration of milk or other dry powder ingredients enables the products to be more soluble and more easily dispensable and free flowing. Most milk agglomerated to date has been used for drinking purposes, with occasional use as a source for making other beverage products, such as protein shakes, etc.
3. The agglomeration process is also expensive and the equipment investment is substantial. This high costs has reduced the availability of the process and therefore has limited new innovation and applications of this technology.

Dry Milk Powder, agglomerated or otherwise as presently available in Bulk or consumer packaging is used primarily for reconstitution, baking, mixing or confectionary needs. No application has been developed or used for purposes of using the milk powder 100% directly in vending machines for beverage purposes.

SUMMARY OF THE INVENTION

The removal of water from milk can result in various dairy ingredients, from condensed milk, to cream, to butter, to whole milk and skim powder. Also, the removal of water from milk offers the manufacturer significant reduction in volume (about 87% of all milk is water), which not only saves in handling and transportation costs but extends the life of the products as much as 18 months, when packaged appropriately.

Over the years as the technology of evaporating and spray drying has evolved from transforming liquid ingredients into a dry powdered form or particle form, so have the applications of using these products.

It is not only milk that is spray dried, but hundreds of other products are also spray dried including eggs; ice cream mixes; coffee whiteners; soy powders and various fruits and vegetables.

The inventor has recognized the advantages of this dry powder technology; particularly where it pertains to milk and the subsequent use of "agglomeration or instantization technology" to enable the dry powdered product to be more soluble and easily dispersible, so that it may be applied in beverages such as coffee and tea as a substitute for liquid milk and non-dairy whiteners.

To accomplish the invention, dry milk powder is obtained from whole milk or skim milk. To obtain skim milk powder, the whole milk is first separated to take out the fat (cream). It is then pasteurized and pumped to an evaporator to remove the water, which condenses the milk to 40% to 50% solids.

From there it is pumped to a spray dryer, where the remaining water is dried (ideal moisture of 2.8% to 3.5%) and the product is dried to powder form.

In order to achieve the right solubility and uniform particle size to mix in beverages such as coffee and tea without lumping or floating the milk needs to be further processed, such as in a two stage dryer or a separate agglomerator.

In this second drying chamber (known as a fluid bed system or agglomerator) air volumes, moisture, and temperatures can be controlled to achieve the desirable composition and functional properties of the powder.

This second stage of drying is called "agglomeration" or "instantizing" of the powders. Agglomeration reduces powder surface area, and provides an open, heavier structure which allows for more even hydration. An agglomerated product offers better and faster dispersion when it is introduced into beverages.

When applied through this production process, using controlled air volumes, moisture and temperatures one is able to achieve a product that when mixed with water dissolves essentially instantly. It is this use of the agglomeration technology when applied to milk that enables the dry milk powder to not only be easily reconstituted for drinking purposes, but can be marketed as "Real Milk" for the use in beverage and vending purposes. There remains no lumping or floating of product versus if it was only spray dried in a single system. It is also a much more free flowing product that does not bridge or cake when dispensed through automatic vending machines.

The inventor has further identified that non fat dry milk powder when manufactured and agglomerated should have a particle bulk density between 0.25 g/cc and 0.34 g/cc; with ideal initial bulk density of 0.28 g/cc; combined with the other controlled factors it is most easily dispersible and free flowing for purposes of adding to a hot beverage whether through a vending machine or directly.

The final product ideally should have moisture ratio of between 2.8% to 3.5%, and scorched particles mass between 7.5 mg and 15.0 mg. A higher scorched particle mass will result in floaters in the beverage and like lumping will be considered adversely by the consumer.

Therefore, a main objective of this invention is to introduce an ideally manufactured agglomerated milk powder that is easily soluble and dispersible for use in automatic vending machines and applicable as an alternative to liquid milk and non dairy powders for use in hot beverages.

These and other objects and features of the invention will be more readily understood from a consideration of the following detailed description, taken with the accompanying drawings, in which corresponding parts are indicated by corresponding numerals.

DETAILED DESCRIPTION OF THE PREFERRED EMBODIMENTS

Figure 1:
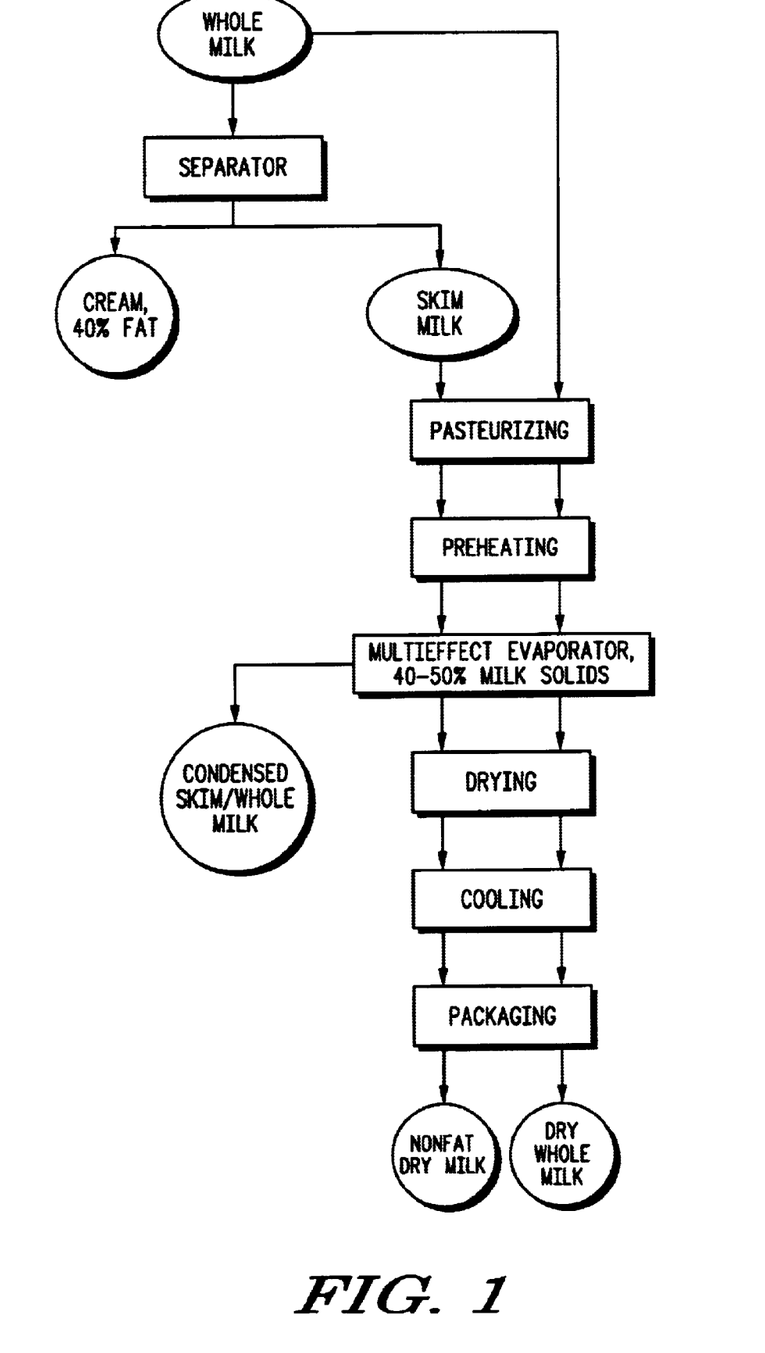
FIG. 1 is a block diagram showing a process for drying milk.

In order to practice the instant invention, it is preferred to agglomerate or instantize liquid milk. FIG. 1 shows a process by which whole milk is processed. In one step, the milk is separated between milk and skim milk. In an additional or alternative step, the whole milk (or the skim milk) is pasteurized and then preheated. Thereafter, the preheated product is treated in an multi-effect evaporator, which yields 40%–50 milk solids. That product may be used as condensed skim or whole milk, or may be dried in a second stage process to result in a completely dried product after cooling and packaging.

It is widely accepted that liquid milk has a shelf-life of on the order of only two weeks, and that dried powdered milk has a shelf-life of up to two years if packaged appropriately.

Figure 2:
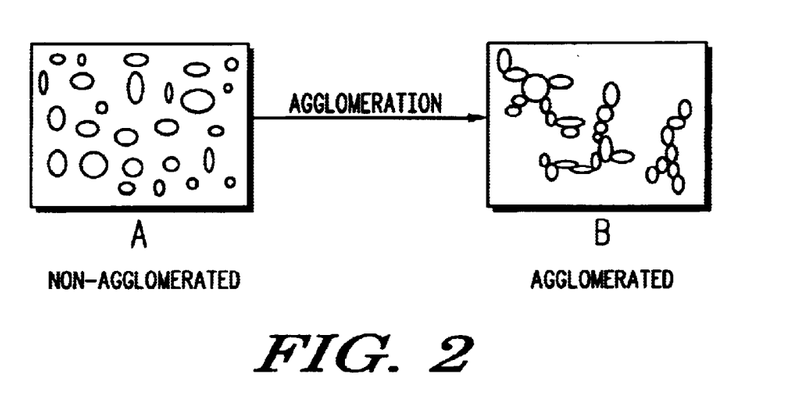
FIG. 2 is a diagrammatic representation of dried milk particles before and after agglomeration.

When it comes time to use the dried powdered milk, the solubility thereof in a beverage is critical to the desirability of the product to the consumer. It is, therefore, preferred that in the processing of the liquid milk into a dried powder, the product be agglomerated or instantized. One way of accomplishing this is through the use of a multi-stage dryer. In a first stage, a spray dryer is used, and in a second stage a fluid bed dryer is employed. Spray drying involves transferring a flowable medium such as liquid milk into a drying chamber, where the liquid droplets are passed through a hot air stream. The objective is to produce a spray of high surface area to mass ratio droplets (ideally of equal size), then to uniformly and quickly evaporate the water. Non-agglomerated powder particles are shown at "A" to the left in FIG. 2, and agglomerated powder particles are shown at "B" to the right in FIG. 2.

EXAMPLE 1

Figure 3:
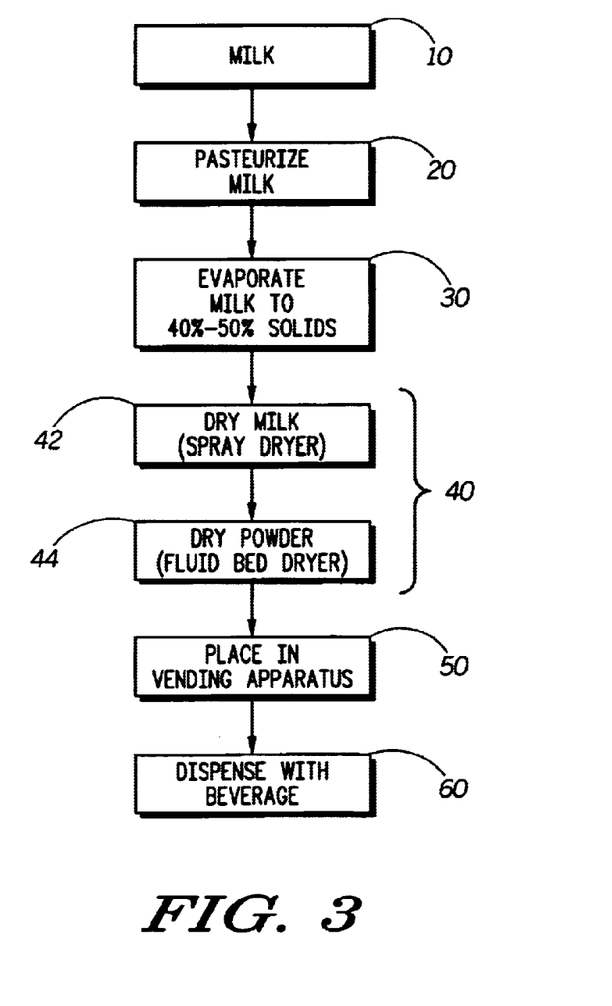
FIG. 3 is a flow diagram of an embodiment of the instant invention.

FIG. 3 shows the preferred process of the instant invention in which milk is provided at step 10. The milk is pasteurized at step 20 and evaporated to 40%–50% solids at step 30. The thus-condensed milk is introduced into a multi-stage dryer at step 40.

In an exemplary embodiment, the multi-stage dryer may include a spray dryer in a first stage 42 and a fluid bed dryer in a second stage 44. However, it is contemplated to be within the scope of the invention that any apparatus and/or procedure which results in agglomerated power can be used, and that the specific apparatus and procedures recited herein are done so by way of example and not by way of limitation. The result of the multi-stage process 40 is an agglomerated or instantized powder which can be either packaged or dispensed via a vending machine for consumer consumption. The specifics of agglomeration and instantization, and alternatives and variations thereof, are known to those who are skilled in the art and need not be discussed further herein. It is to be understood, however, that agglomerated product is preferred, since agglomeration reduces powder surface area, and provides an open, heavier structure which allows for more even hydration. The particles sink below the surface of the liquid, such as a beverage, and break apart, allowing smaller particles within the agglomerate to completely hydrate. This means better and faster dispersion within a beverage. While individual powder particles of typical food products are usually less than 100 microns, agglomerates are typically 250 to 400 microns. Bulk density decreases from approximately 42 pounds per cubic foot to approximately 28 pounds per cubic foot.

The agglomerated powdered milk is then packaged, transported through a distribution network and placed into automated vending machines (shown as step 50) to be dispensed on demand at step 60 with various beverages, such as coffee, tea, cappuccino and hot chocolate.

EXAMPLE 2

Figure 4:
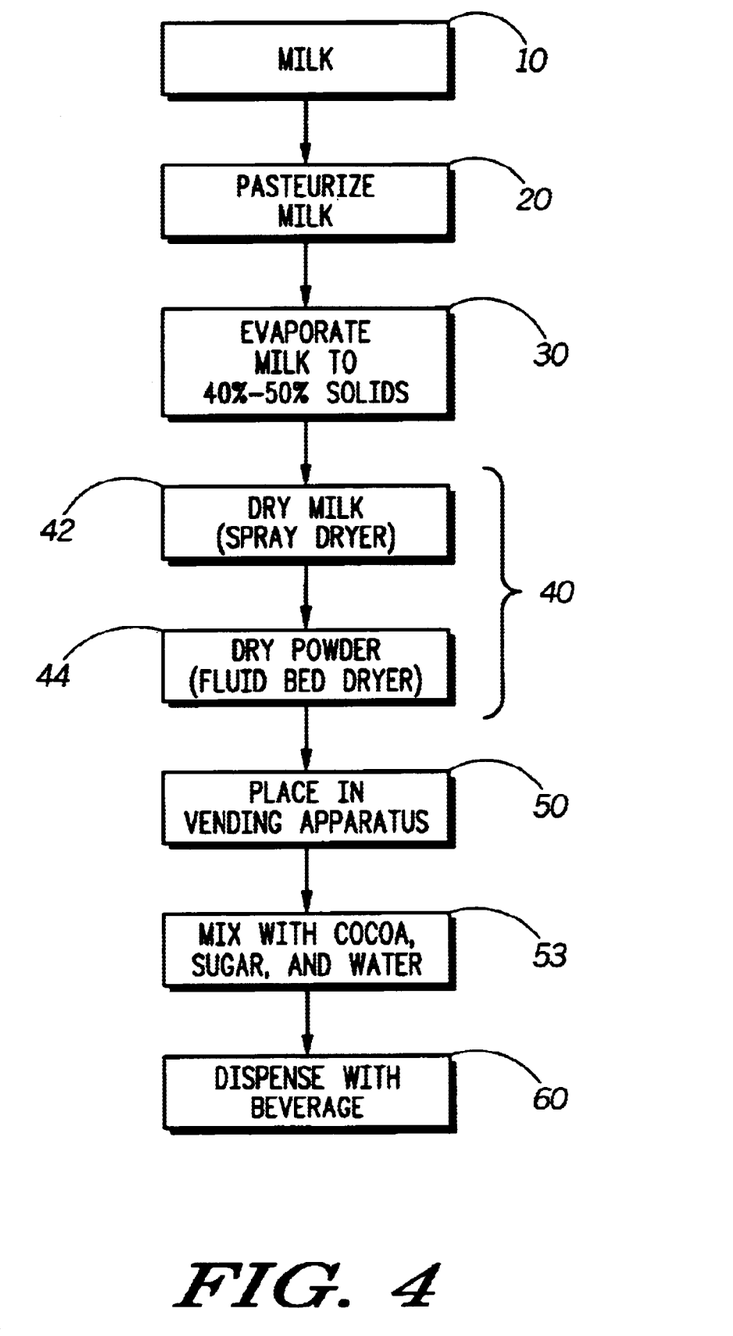
FIG. 4 is a flow diagram of an alternative embodiment of the instant invention.

The procedure for this example repeats the steps detailed in an Example 1 but interposes the intermediate step, shown in FIG. 4, of combining the agglomerated milk powder with cocoa or chocolate powder, sugar and water, and then mixing and heating the mixture for consumption as a hot beverage.

EXAMPLE 3

Figure 5:
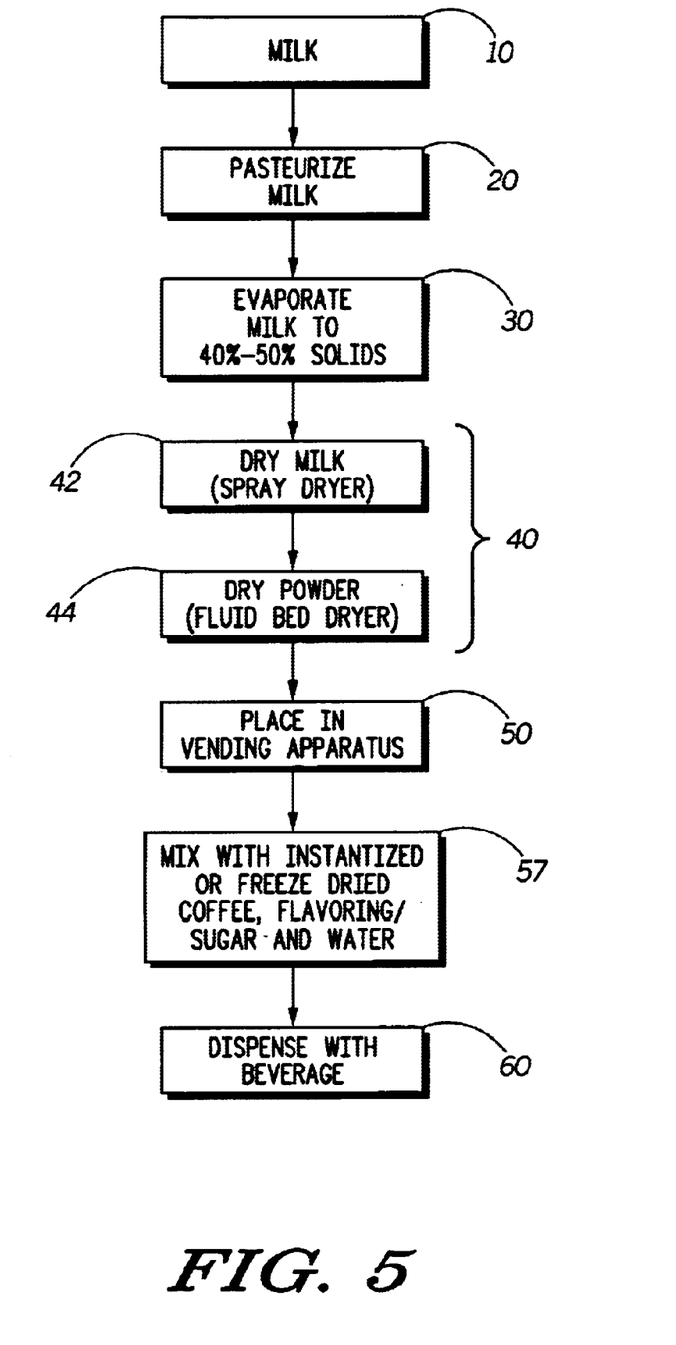
FIG. 5 is a flow diagram of a second alternative embodiment of the instant invention.

The procedure of FIG. 3 is followed, but the agglomerated milk powder is combined with ground coffee and water, then whipped or emulsified as known in the art, and heated for consumption as a cappuccino beverage, at step 70 in FIG. 5.

EXAMPLE 4

Figure 6:
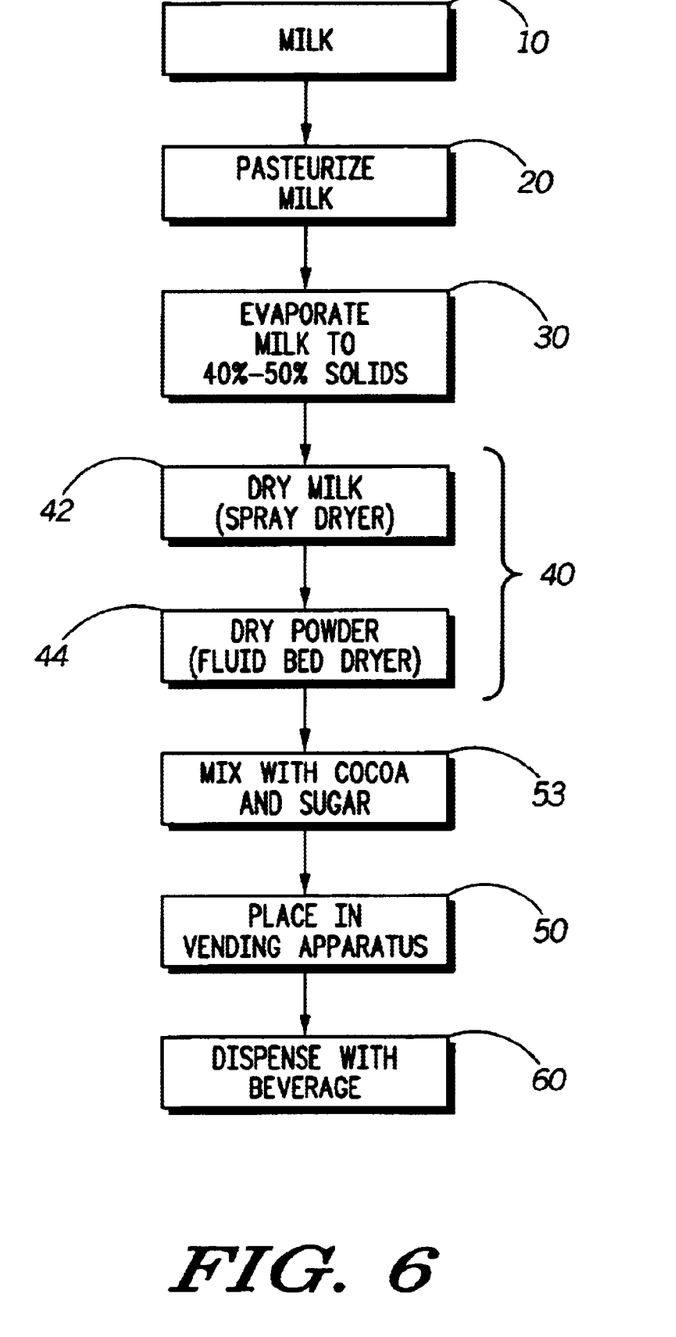
FIG. 6 is a flow diagram of a third alternative embodiment of the instant invention.

FIG. 6 shows a third alternative embodiment of the invention in which the powdered agglomerated milk is mixed with cocoa powder, sugar and any incidental preservative ingredient(s) prior to being placed in the vending apparatus to formulate an all natural hot chocolate beverage. Alternatively, the mixtures can be consumed directly without the use of a vending device. As such, steps 50 and 53 are essentially reversed, with the addition of water being deleted from step 53 and added to step 60. In this way, a more simplified vending procedure can be realized wherein a single serving quantity of combined powdered agglomerated milk, cocoa powder and sugar can be mixed with water by the vending machine without having to have separate stage compartments in vending channels for each of the separate ingredients.

EXAMPLE 5

Figure 7:
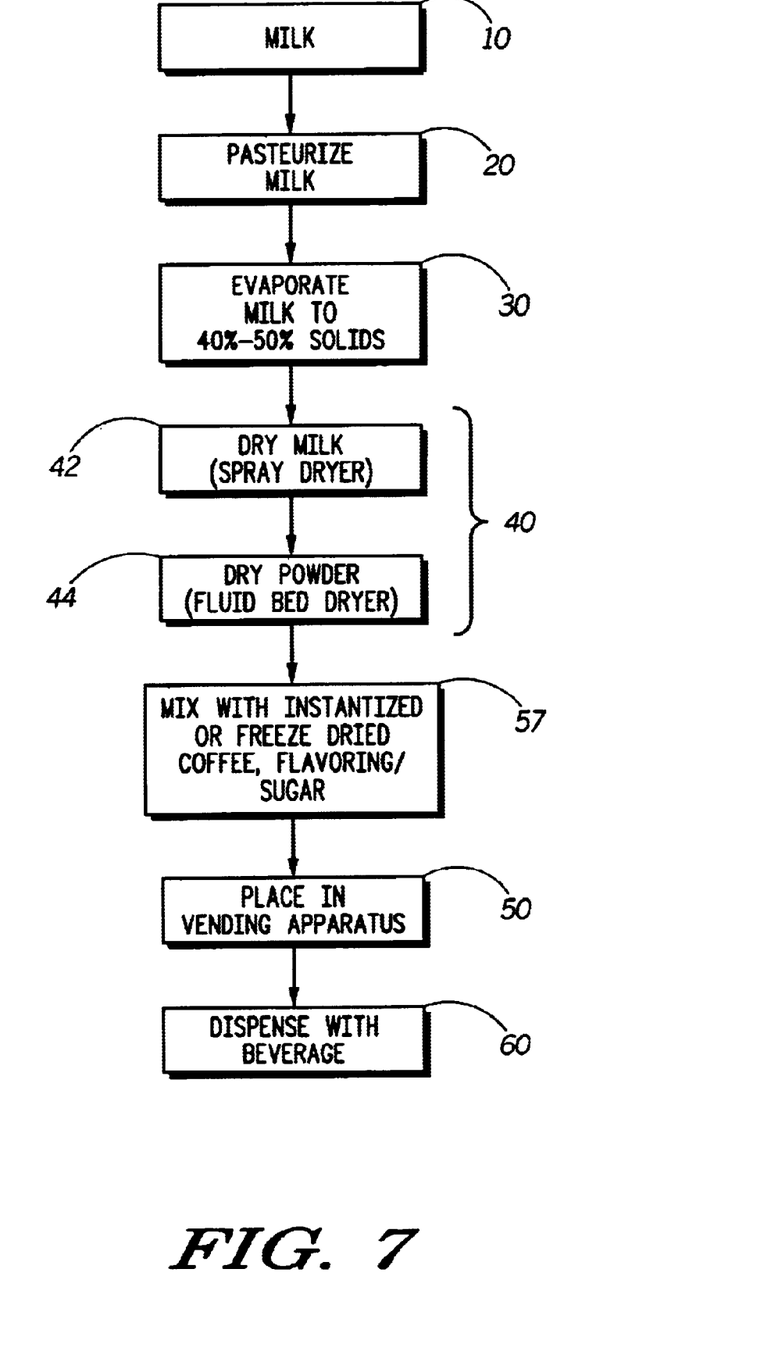
FIG. 7 is a flow diagram of a fourth alternative embodiment of the instant invention.

FIG. 7 shows a fourth alternative embodiment of the invention in which the powdered agglomerated milk is mixed with instantized or freeze dried coffee, flavoring (optional) and sugar prior to being placed in the vending machine, for direct consumption or for use in the vending machine to formulate an all natural cappuccino beverage. As such, steps 50 and 57 of FIG. 5 are reversed, with water being deleted at step 57 and added to step 60. In this way, the combined powdered agglomerated milk, coffee, flavoring (if any), and sugar (if any), can be combined as a mixture and stored in a single compartment within the vending machine and dispensed in single serving portions on demand.

EXAMPLE 6

Figure 8:
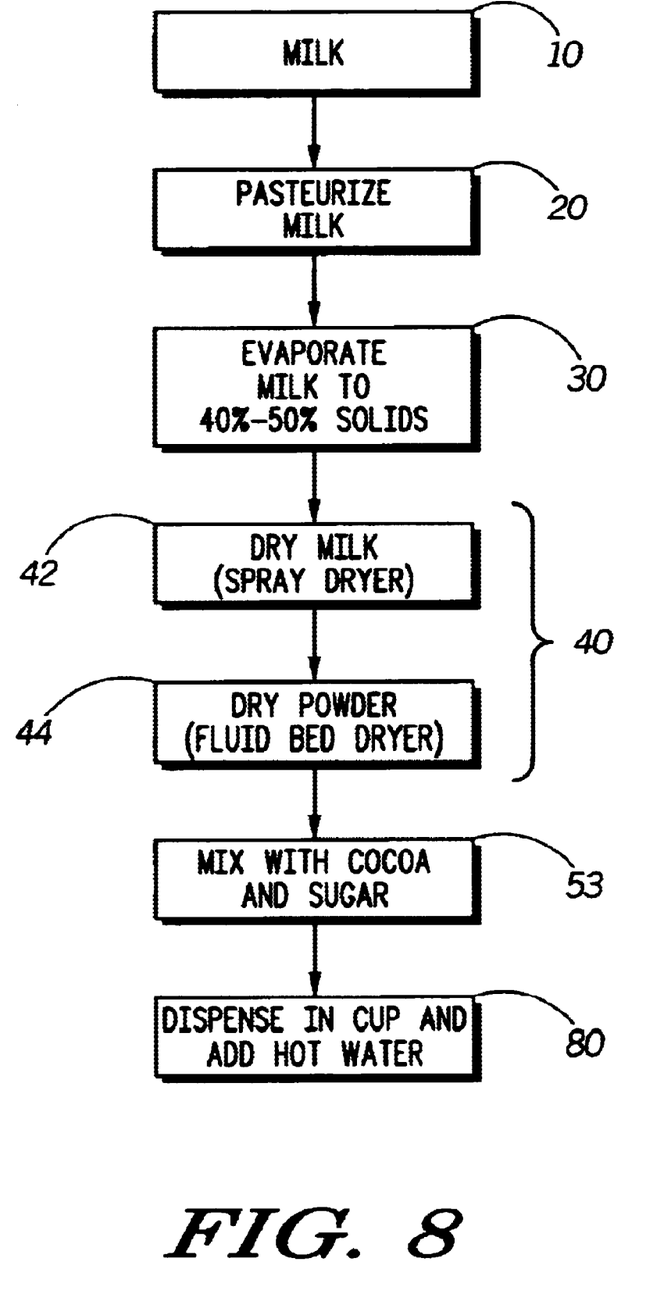
FIG. 8 is a flow diagram of a fifth alternative embodiment of the instant invention.
Figure 9:
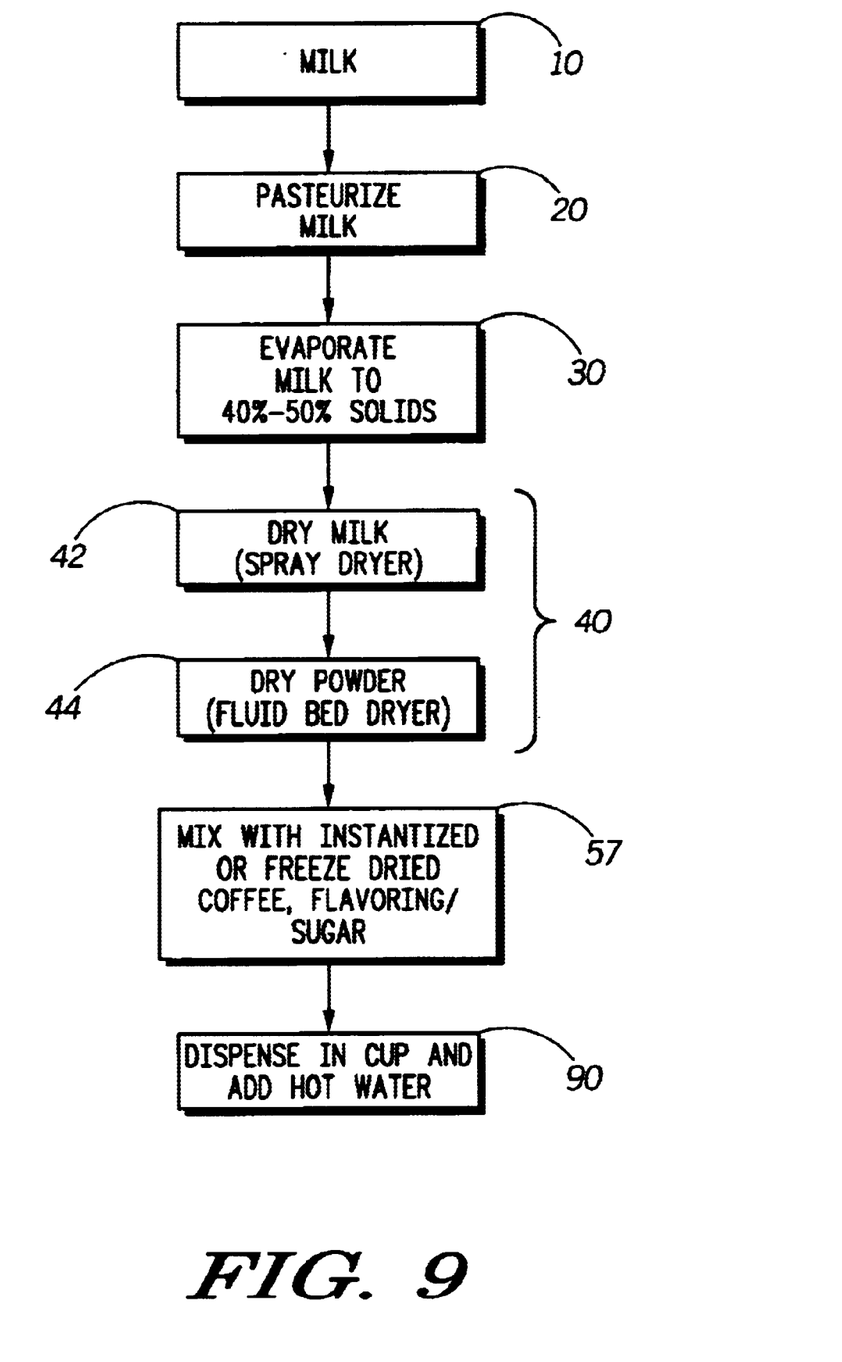
FIG. 9 is a flow diagram of a sixth alternative embodiment of the instant invention.

The agglomerated natural milk powder resulting from step 44 can be placed into any suitable container such as a consumer package for transportation and retail sale or other disposition. Moreover, as shown in FIGS. 8 and 9, respectively, the agglomerated natural milk powder resulting from step 44 can be mixed with cocoa powder (and sugar optionally, but not by a way of limitation), at step 55, and the resulting mixture then placed into packaging for distribution to consumer, whereupon, when desired, the consumers can place the mixture into a beverage cup and add water, as shown instep 80 in FIG. 8. Likewise, the agglomerated natural milk powder resulting from step 44 can be mixed with instantized or freeze dried coffee (and flavoring and/or sugar optionally, but not by a way of limitation) at step 57, and placed into a packaging for distribution to consumers. Thereafter, the mixture of instantized and/or freeze dried coffee and agglomerated natural milk powder can be dispensed into a beverage cup and mixed with hot water for consumption. The packaging into which the agglomerated natural milk powder is placed can be a single serving package or a bulk container. Likewise, the agglomerated natural milk powder mixed with either cocoa powder or powdered coffee can be placed into single serving or bulk containers. Having described the invention, many modifications thereto will become apparent to those skilled in the art to which it pertains without deviating from the spirit of the invention as defined by the scope of the following claims.

EXAMPLE 7

Figure 10:
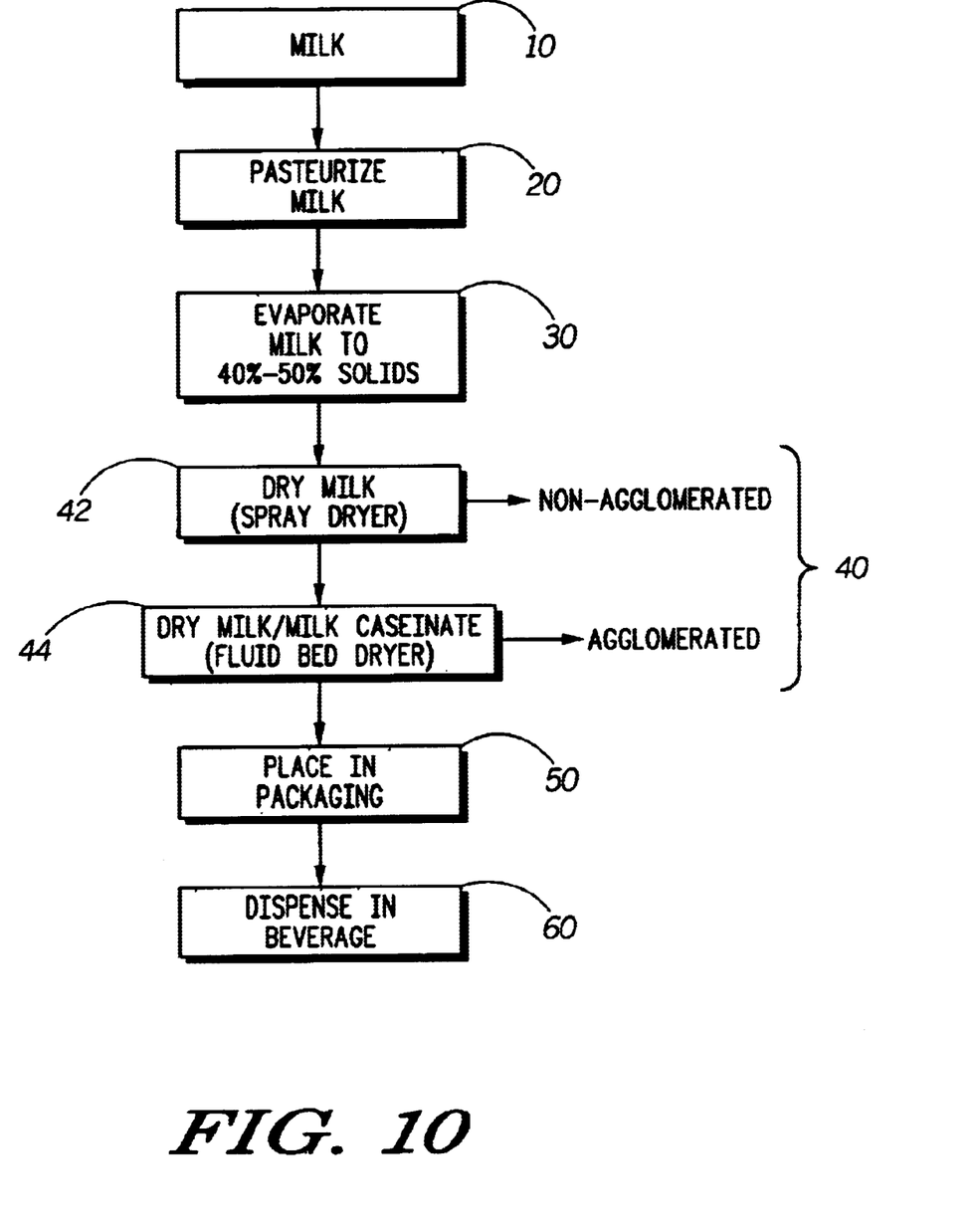
FIG. 10 is a flow diagram of a seventh alternative embodiment of the instant invention.

FIG. 10 shows an alternative embodiment of the invention in which the dry powdered milk (step 42) while being transferred from the spray dryer to the fluid bed dryer for agglomeration (step 44) is combined with two percent milk caseinates to enhance color profile on a natural basis enabling the finished product to be directly used as an agglomerated natural creamer for coffee; tea and hot beverages. All other processing parameters as applied in Example 1 continue to remain the same.

What is claimed is:

1. A method of preparing a consumable beverage which includes a natural dairy beverage additive in powder soluble form, comprising the steps of:
    agglomerating liquid natural milk into a natural dairy beverage additive powder such that the powder has a particle bulk density in the range of 0.25 g/cc to 0.34 g/cc and a scorched particle mass not greater than 15 milligrams;
    placing the powder into a device which vends beverages; and
    vending the powder into beverages vended from the device upon demand.

2. The method of claim 1, wherein the step of agglomerating includes the step of pasteurizing the natural liquid milk, evaporating the milk to approximately 40% to 50% solids, and converting the evaporated milk to an agglomerated powder.

3. The method of claim 2, wherein the step of agglomerating includes the steps of spray drying the milk in a first stage and fluid bed drying the milk in a second stage.

4. A method of preparing a consumable beverage which includes a natural dairy beverage additive in powder soluble form, comprising the steps of:
    agglomerating a natural dairy beverage into a natural dairy beverage additive powder such that the powder has a particle bulk density in the range of 0.25 g/cc to 0.34 g/cc and a scorched particle mass not greater than 15 milligrams;
    combining, in an automated vending machine, the additive powder with cocoa powder, sugar and water; and
    heating, in the automated vending machine, the combined dairy beverage powder, cocoa powder, sugar and water.

5. A method of preparing a consumable beverage containing a natural dairy beverage additive, comprising the steps of:
    agglomerating a natural dairy beverage into a natural dairy beverage additive powder such that the powder has a particle bulk density in the range of 0.25 g/cc to 0.34 g/cc and a scorched particle mass not greater than 15 milligrams;
    combining, in an automated vending machine, the additive powder with ground coffee and water;
    whipping, using the vending machine, the combined additive powder, ground coffee, and water; and
    heating, using the vending machine, the mixture of ground coffee, powder and water to make a cappuccino beverage.

6. A method of preparing a consumable beverage includes a natural dairy additive, comprising the steps of:
    agglomerating a natural dairy beverage into a natural dairy beverage additive powder such that the powder has a particle bulk density in the range of 0.25 g/cc to 0.34 g/cc and a scorched particle mass not greater than 15 milligrams;
    combining the additive powder with cocoa powder and sugar;
    placing the combined powders in a vending machine; and
    mixing the combined powders with water, upon demand in the automated vending machine.

7. A method of preparing a consumable beverage which includes a natural dairy additive, comprising the steps of:
    agglomerating a natural dairy beverage into a natural dairy beverage additive powder such that the powder has a particle bulk density in the range of 0.25 g/cc to 0.34 g/cc and a scorched particle mass not greater than 15 milligrams;
    combining the additive powder with instantized coffee powder;
    placing the combined powders in a vending machine; and
    combining the powders with water in the vending machine resulting in a cappuccino beverage.

8. A method of preparing a natural dairy additive for a consumable beverage, comprising the steps of:
    agglomerating a natural dairy beverage into a natural dairy beverage additive powder such that the powder has a particle bulk density in the range of 0.25 g/cc to 0.34 g/cc and a scorched particle mass not greater than 15 milligrams;
    combining the additive powder with cocoa powder;
    placing the combined powders into a consumer package.

9. A method of preparing a consumable dairy beverage into a natural dairy beverage additive, comprising the steps of:
    agglomerating a natural dairy beverage into a natural diary beverage additive powder such that the powder has a particle bulk density in the range of 0.25 g/cc to 0.34 g/cc and a scorched particle mass not greater than 15 milligrams;

combining the additive powder with ground coffee; and placing the combined powders into a consumer package.

10. A method of preparing a dairy beverage which includes a natural dairy beverage additive, comprising the steps of:

agglomerating liquid natural milk into a natural dairy beverage additive powder such that the powder has a particle bulk density in the range of 0.25 g/cc to 0.34 g/cc and a scorched particle mass not greater than 15 milligrams; and placing the powder into a device which vends beverages.

11. A method of preparing a consumable beverage which includes a natural dairy beverage additive in powder soluble form, comprising the steps of:

agglomerating liquid natural milk and milk caseinates to form a completely natural dairy creamer such that the creamer has a particle bulk density in the range of 0.25 g/cc to 0.34 g/cc and a scorched particle mass not greater than 15 milligrams; and packaging the agglomerated natural dairy powder in single serving or bulk packaging to be directly mixed in a hot beverage as an alternative additive to non-dairy creamers or fluid milk.

12. The method of claim 1, wherein the step of agglomerating comprises the step of agglomerating liquid natural milk into a natural dairy beverage additive powder such that the powder has a moisture ratio in the range of 2.8% to 3.5%.

13. The method of claim 1, wherein the step of agglomerating comprises the step of agglomerating liquid natural milk into a natural dairy beverage additive powder such that the powder has a scorched particle mass in the range of 7.5 milligrams to 15 milligrams.

14. The method of claim 4, wherein the step of agglomerating comprises the step of agglomerating a natural dairy beverage into a natural dairy beverage additive powder such that the powder has a moisture ratio in the range of 2.8% to 3.5%.

15. The method of claim 4, wherein the step of agglomerating comprises the step of agglomerating a natural dairy beverage into a natural dairy beverage additive powder such that the powder has a scorched particle mass in the range of 7.5 milligrams to 15 milligrams.

16. The method of claim 5, wherein the step of agglomerating comprises the step of agglomerating a natural dairy beverage into a natural dairy beverage additive powder such that the powder has a moisture ratio in the range of 2.8% to 3.5%.

17. The method of claim 5, wherein the step of agglomerating comprises the step of agglomerating a natural dairy beverage into a natural dairy beverage additive powder such that the powder has a scorched particle mass in the range of 7.5 milligrams to 15 milligrams.

18. The method of claim 6, wherein the step of agglomerating comprises the step of agglomerating a natural dairy beverage into a natural dairy beverage additive powder such that the powder has a moisture ratio in the range of 2.8% to 3.5%.

19. The method of claim 6, wherein the step of agglomerating comprises the step of agglomerating a natural dairy beverage into a natural dairy beverage additive powder such that the powder has a scorched particle mass in the range of 7.5 milligrams to 15 milligrams.

20. The method of claim 7, wherein the step of agglomerating comprises the step of agglomerating a natural dairy beverage into a natural dairy beverage additive powder such that the powder has a moisture ratio in the range of 2.8% to 3.5%.

21. The method of claim 7, wherein the step of agglomerating comprises the step of agglomerating a natural dairy beverage into a natural dairy beverage additive powder such that the powder has a scorched particle mass in the range of 7.5 milligrams to 15 milligrams.

22. The method of claim 8, wherein the step of agglomerating comprises the step of agglomerating a natural dairy beverage into a natural dairy beverage additive powder such that the powder has a moisture ratio in the range of 2.8% to 3.5%.

23. The method of claim 8, wherein the step of agglomerating comprises the step of agglomerating a natural dairy beverage into a natural dairy beverage additive powder such that the powder has a scorched particle mass in the range of 7.5 milligrams to 15 milligrams.

24. The method of claim 9, wherein the step of agglomerating comprises the step of agglomerating a natural dairy beverage into a natural dairy beverage additive powder such that the powder has a moisture ratio in the range of 2.8% to 3.5%.

25. The method of claim 9, wherein the step of agglomerating comprises the step of agglomerating a natural dairy beverage into a natural dairy beverage additive powder such that the powder has a scorched particles mass in the range of 7.5 milligrams to 15 milligrams.

26. The method of claim 10, wherein the step of agglomerating comprises the step of agglomerating liquid natural milk into a natural dairy beverage additive powder such that the powder has a moisture ratio in the range of 2.8% to 3.5%.

27. The method of claim 10, wherein the step of agglomerating comprises the step of agglomerating liquid natural milk into a natural dairy beverage additive powder such that the powder has a scorched particles mass in the range of 7.5 milligrams to 15 milligrams.

28. The method of claim 11, wherein the step of agglomerating comprises the step of agglomerating liquid natural milk and milk caseinates to form a completely natural dairy creamer such that the creamer has a moisture ratio in the range of 2.8% to 3.5%.

29. The method of claim 11, wherein the step of agglomerating comprises the step of agglomerating liquid natural milk and milk caseinates to form a completely natural dairy creamer such that the creamer has a scorched particle mass in the range of 7.5 milligrams to 15 milligrams.

* * * * *

US006777014C1

(12) INTER PARTES REEXAMINATION CERTIFICATE (1238th)
United States Patent
Singh (10) Number: US 6,777,014 C1
(45) Certificate Issued: Feb. 26, 2016

(54) AGGLOMERATED MILK IN COFFEE AND TEA

(75) Inventor: Harjit Singh, Ft. Lauderdale, FL (US)

(73) Assignee: NATURE'S FIRST, INC.

Reexamination Request:
No. 95/000,238, Apr. 20, 2007

Reexamination Certificate for:
Patent No.: 6,777,014
Issued: Aug. 17, 2004
Appl. No.: 09/898,968
Filed: Jul. 3, 2001

(51) Int. Cl.
| | | |
|---|---|---|
| A23C 9/00 | (2006.01) |
| A23C 9/16 | (2006.01) |
| A23F 5/24 | (2006.01) |
| A23F 5/26 | (2006.01) |
| A23G 3/34 | (2006.01) |
| A23G 9/52 | (2006.01) |
| A23C 1/05 | (2006.01) |
| A23C 9/15 | (2006.01) |
| A23F 5/40 | (2006.01) |
| A47J 31/44 | (2006.01) |
| A47J 31/40 | (2006.01) |

(52) U.S. Cl.
CPC ............... *A23C 1/05* (2013.01); *A23C 9/1512* (2013.01); *A23C 9/16* (2013.01); *A23F 5/267* (2013.01); *A23F 5/40* (2013.01); *A23G 3/346* (2013.01); *A23G 9/52* (2013.01); *A23G 2200/12* (2013.01); *A47J 31/40* (2013.01); *A47J 31/401* (2013.01); *A47J 31/4485* (2013.01)

(58) Field of Classification Search
None
See application file for complete search history.

(56) References Cited

To view the complete listing of prior art documents cited during the proceeding for Reexamination Control Number 95/000,238, please refer to the USPTO's public Patent Application Information Retrieval (PAIR) system under the Display References tab.

*Primary Examiner* — Gary Kunz (57) ABSTRACT

A process for preparing a consumable beverage containing a natural dairy beverage additive in the form of agglomerated natural milk powder. The powder is combined with other ingredients, either prior to being placed in the vending machine or upon demand within the vending machine, for the subsequent creation of a consumable beverage which includes the natural dairy beverage additive.

INTER PARTES REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 3, line 62 -column 4, line 19:

In an exemplary embodiment, the multi-stage dryer may include a spray dryer in a first stage 42 and a fluid bed dryer in a second stage 44. However, it is contemplated to be within the scope of the invention that any apparatus and/or procedure which results in agglomerated power can be used, and that the specific apparatus and procedures recited herein are done so by way of example and not by way of limitation. The result of the multi-stage process 40 is an agglomerated or instantized powder which can be either packaged or dispensed via a vending machine for consumer consumption. The specifics of agglomeration and instantization, and alternatives and variations thereof, are known to those who are skilled in the art and need not be discussed further herein. It is to be understood, however, that agglomerated product is preferred, since agglomeration [reduces powder surface area, and] provides an open, heavier structure which allows for more even hydration. The particles sink below the surface of the liquid, such as a beverage, and break apart, allowing smaller particles within the agglomerate to completely hydrate. This means better and faster dispersion within a beverage. While individual powder particles of typical food products are usually less than 100 microns, agglomerates are typically 250 to 400 microns. [Bulk density decreases from approximately 42 pounds per cubic foot to approximately 28 pounds per cubic foot.]

Column 4, lines 28-33:

The procedure for this example repeats the steps detailed in an Example 1 but interposes the intermediate step, shown *as step 53* in FIG. 4, of combining the agglomerated milk powder with cocoa or chocolate powder, sugar and water, and then mixing and heating the mixture for consumption as a hot beverage.

Column 4, lines 36-39:

The procedure of FIG. 3 is followed, but the agglomerated milk powder is combined with ground coffee and water *as shown at step 57 of FIG. 5*, then whipped or emulsified as known in the art, and heated for consumption as a cappuccino beverage[, at step 70 in FIG. 5].

Column 5, lines 8-35:

The agglomerated natural milk powder resulting from step 44 can be placed into any suitable container such as a consumer package for transportation and retail sale or other disposition. Moreover, as shown in FIGS. 8 and 9, respectively, the agglomerated natural milk powder resulting from step 44 can be mixed with cocoa powder (and sugar optionally, but not by a way of limitation), at step [55] *53*, and the resulting mixture then placed into packaging for distribution to consumer, whereupon, when desired, the consumers can place the mixture into a beverage cup and add water, as shown [instep] *in step* 80 in FIG. 8. Likewise, the agglomerated natural milk powder resulting from step 44 can be mixed with instantized or freeze dried coffee (and flavoring and/or sugar optionally, but not by a way of limitation) at step 57, and placed into a packaging for distribution to consumers. Thereafter, the mixture of instantized and/or freeze dried coffee and agglomerated natural milk powder can be dispensed into a beverage cup and mixed with hot water for consumption. The packaging into which the agglomerated natural milk powder is placed can be a single serving package or a bulk container. Likewise, the agglomerated natural milk powder mixed with either cocoa powder or powdered coffee can be placed into single serving or bulk containers. Having described the invention, many modifications thereto will become apparent to those skilled in the art to which it pertains without deviating from the spirit of the invention as defined by the scope of the following claims.

AS A RESULT OF REEXAMINATION, IT HAS BEEN DETERMINED THAT:

Claims 1-29 are cancelled.

\* \* \* \* \*